United States Patent [19]

Oblinger et al.

[11] Patent Number: 4,785,699
[45] Date of Patent: Nov. 22, 1988

[54] WINDSHIELD WIPER BLADE SLITTING DEVICE

[75] Inventors: Fred G. Oblinger; Arnold E. Anderson, both of Livonia, Mich.

[73] Assignee: Ford Motor Company, Dearborn, Mich.

[21] Appl. No.: 945,146

[22] Filed: Dec. 22, 1986

[51] Int. Cl.⁴ .............................................. B26D 1/24
[52] U.S. Cl. ..................................... 83/425; 83/422; 83/424; 83/432; 83/444; 83/449; 83/501
[58] Field of Search ...................... 83/440.1, 444, 446, 83/449, 422, 424, 425, 432, 500-502

[56] References Cited

U.S. PATENT DOCUMENTS

| | | | |
|---|---|---|---|
| 1,881,020 | 10/1932 | McFarland | 83/441 |
| 1,895,246 | 1/1933 | Hale et al. | 83/500 X |
| 3,786,706 | 1/1974 | Hyatt et al. | 83/444 X |
| 3,828,638 | 8/1974 | Bonney, Jr. | 83/444 X |
| 3,982,455 | 9/1976 | Bowman | 83/444 X |
| 4,028,973 | 6/1977 | Bogdanski et al. | 83/501 X |
| 4,330,092 | 5/1982 | Roman | 83/501 X |
| 4,497,233 | 2/1985 | Papalexis et al. | 83/444 X |

Primary Examiner—Frank T. Yost
Attorney, Agent, or Firm—Daniel M. Stock; Clifford L. Sadler

[57] ABSTRACT

A device for slitting an elastomeric strip into two identical halves of cross-section suitable for use as windshield wiper blades includes a drive roller which grips the strip and draws it through stationary dies past the operative cutting area of a pair of rotary cutters having cutting tip configurations and placement effecting cutting of the strip to provide sharp, consistent corners at the resulting blade tips.

19 Claims, 3 Drawing Sheets

WINDSHIELD WIPER BLADE SLITTING DEVICE

BACKGROUND OF THE INVENTION

The present invention relates generally to devices for the manufacture of windshield wiper blades and more specifically to slitting devices used in such manufacture.

DESCRIPTION OF THE PRIOR ART

Automotive windshield wiper blades are manufactured through molding or extruding a continuous strip of elastomeric material to form a double cross-section of windshield wiper configuration arranged in mirror image fashion, having a plane of symmetry passing through a small portion of generally rectangular cross-section defining the tip of the wiper blade. The two halves of the cross-section are then slit along the plane of symmetry, and the resulting halves are cut to length. The edge formed during the slitting operation is critical to the performance of the wiper blade on the automobile. Sharpness of the corners formed and uniformity of this edge is highly desirable. In the wiper blade manufacturing industry, stationary knives have been employed to cut apart the formed sections along their line of symmetry as the strip is drawn past the knife.

It is also known in the prior art to separate elastomeric materials with the use of rotary cutters. U.S. Pat. No. 1,881,020 to McFarland illustrates the separation of an electrical cable pair through use of such cutters.

The flexibility of the wiper blade strip crosssection in the region defining the tips of the wiper blade has created problems in manufacturing, however, that have not been solved by the known manufacturing techniques.

SUMMARY OF THE INVENTION

Responsive to the needs of the automotive industry to reliably manufacture windshield wiper blades having sharp cornered and consistent blade edges and responsive to the deficiencies in the prior art. Applicants have designed an improved device for slitting windshield wiper blade strips which employs a rotary cutting mechanism. The device is configured to reduce loading on the blade strip which may tend to deform it at its edge and to provide support to the flexible section of the extrusion at which the blade wiping edges are formed.

The slitting device of the present invention employs drive rollers which grip and drive the strip through a stationary guide accurately positioned with respect to a pair of spaced cutting discs which rotate about parallel axes. Unpowered guide rollers position the extrusion along the cutting path and support the slit wiper blade sections after cutting.

BRIEF DESCRIPTION OF THE DRAWINGS

The advantages of the invention slitting device will be apparent to those skilled in the art of automotive windshield wiper blade manufacturing upon reading the following description with reference to the accompanying drawings in which.

DESCRIPTION OF THE PRFERRED EMBODIMENTS

Figure 1:
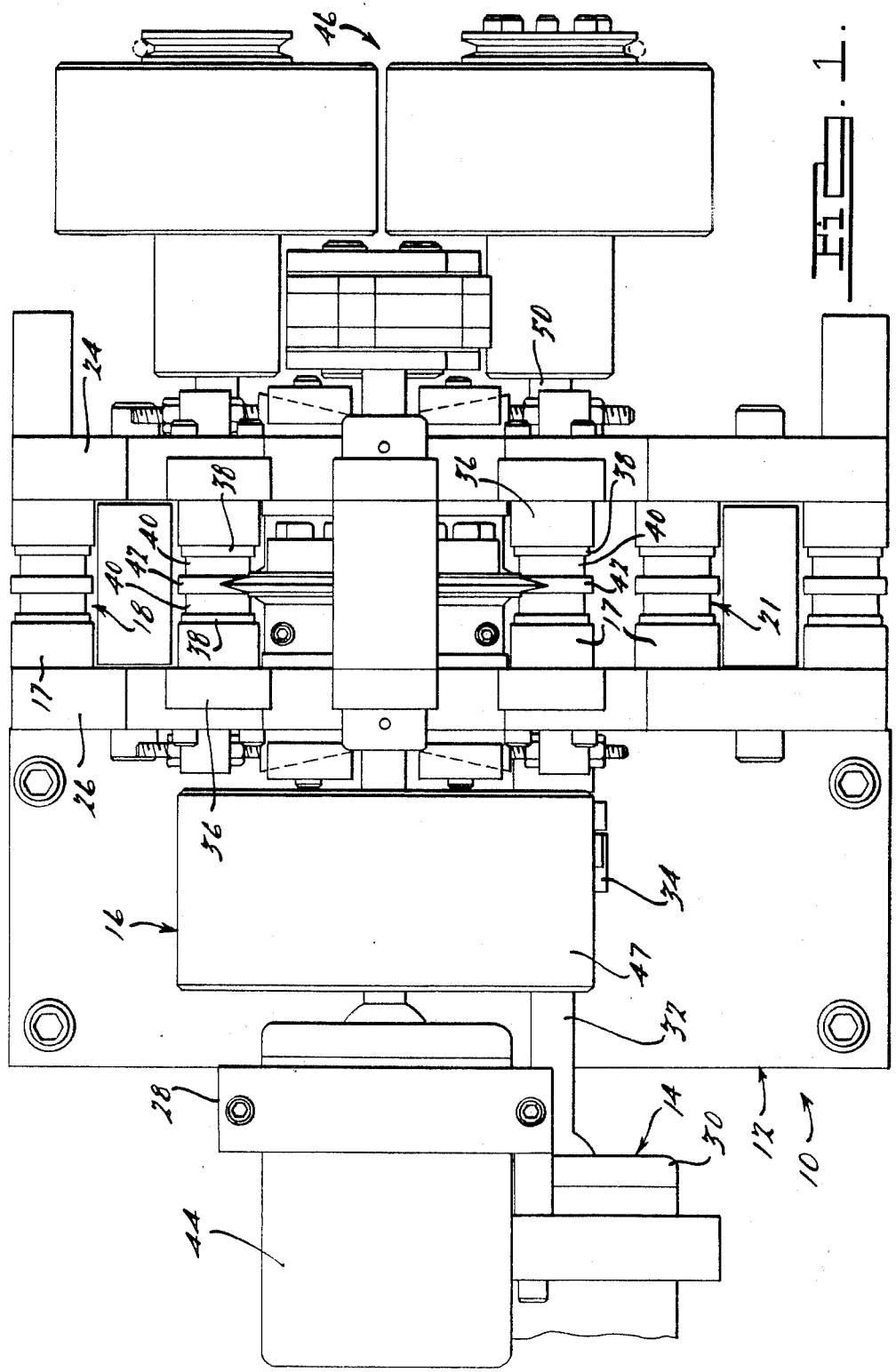
FIG. 1 is a top view of the device of the present invention.

Turning now to the drawings, and in particular in FIG. 1 thereof, the slitting device 10 of the present invention is illustrated as comprising generally a structural base portion 12, a blade drive system 14, a disc drive system 16, a guide roller system 18, and a stationary guide assembly 19.

The structural base portion 12 consists of mounting feet portions as indicated at 20 and 22 and support walls 24, 26 extending upwardly from the foot portion 22 for providing journal-like support in a conventional manner for the drive roller system 14, the disc drive system 16 and the guide roller system 18. In addition, another upstanding support wall structure 28 is provided for supporting portions of the blade drive system 14 and the disc drive system 16.

The blade drive system 14 preferably consists of an electric motor such as is indicated generally at 30 having an output shaft portion 32 connected through a flexible coupling 34 to a blade drive roller 36. The motor 30 drivingly engages the roller 36 which is supported in conventional fashion for rotation in the spaced apart support walls 24, 26 of the base portion 12. Reduced diameter portions 38, 40, 42, for example, of the roller 36 are sized to pinchingly engage a molded or extruded strip having a cross-sectional configuration desired for forming a windshield wiper blade such as that illustrated in cross-section in FIGS. 3 and 4. The cross-section of the interior cavity of the stationary guide 19 is representative of such a cross-section.

The disc drive system 16 includes a slitting disc motor such as indicated as an electric motor 44 carried by the support wall 28 of the base portion 12 and being drivingly connected to a power transmission system such as the gear and pulley arrangement indicated generally at 46 through an inertia wheel 47. A pair of drive shafts 48, 50 drivingly engage a pair of rotary cutters 52, 54, respectively. The shafts 48, 50 are supported for rotation as by bushings indicated at 54 in a movable cutter housing 56 which is connected in an adjustably positioning fashion to the support wall 26 as by set screw arrangements indicated at 58. Movement of the shafts 48, 50 with the housing 56 is permitted by a known flexible mounting for the gear and pulley arrangement 46 of the type in which pivotally mounted links interconnect gear shafts of the gear set to maintain center-to-center distances as the gears mounted on the shafts 48, 50 are adjustably moved. The gear and pulley arrangement 46 and the slitting disc inertia wheel 47 are formed of conventional components to provide for the driving of the discs 52, 54 at substantially constant speed in a rotative direction allowing contact of the disc tips with the wiper blade strip to occur with the disc tips rotating to contact the wiper blade strip tangentially in the same direction. The partiicular arrangement of components illustrated in the preferred embodiment is but one approach that will yield this result with the use of a single driving motor such as the electric motor 44. Other drive arrangements will occur to those skilled in the art.

The guide roller system 18 includes guide rollers 17 rotatively supported in the walls 24,26 in a conventional manner. The rollers 17 have shaped central sections 21 similar to the reduced diameter sections 38, 40, 42 of drive roller 36. They differ in that they are sized to support the molded or extruded strip without pinchingly engaging it as is the case with the drive roller 36. This support is effected by arranging the rotative axes of the rollers 17 parallel to that of the drive roller 36 and arranging the shaped central sections 21 to be aligned with the reduced diameter sections 38,40,42 of the drive roller 36 in the path of movement of the wiper strip through the device 10, left to right as seen in FIG. 1.

Figure 2:
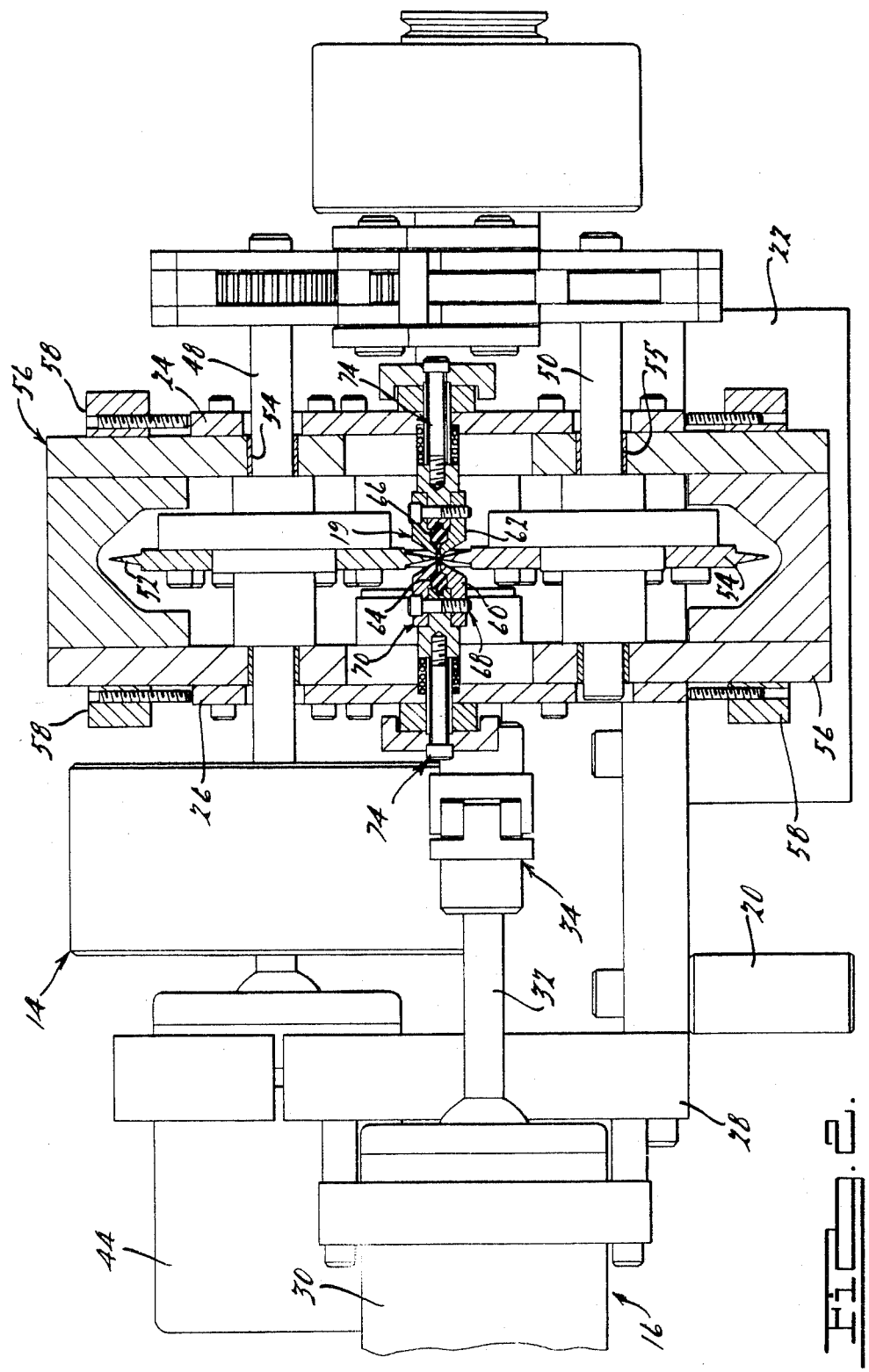
FIG. 2 is a cross-sectional view taken along line II—II of FIG. 1.

The stationary guide assembly 19, as may best be seen in FIG. 2, is simply supported between the walls 24, 26 of base portion 12. The stationary guide assembly 19 consists of a pair of dies 60, 62, each having a cavity 64, 66 formed within it for closely surrounding the wiper blade strip, being shaped to conform to the desired shape of a wiper blade. In the embodiment illustrated, a mounting screw arrangement 68 fastens a die portion such as that indicated at 70 to an adjusting base 72 which is adjustably carried in one of the support walls 24, 26 through an adjusting screw and spring arrangement 74 to permit the setting of a gap between the two die portions. Other die replacement mechanisms and other adjusting mechanisms are possible without departing from the scope of the present invention.

Figure 3:
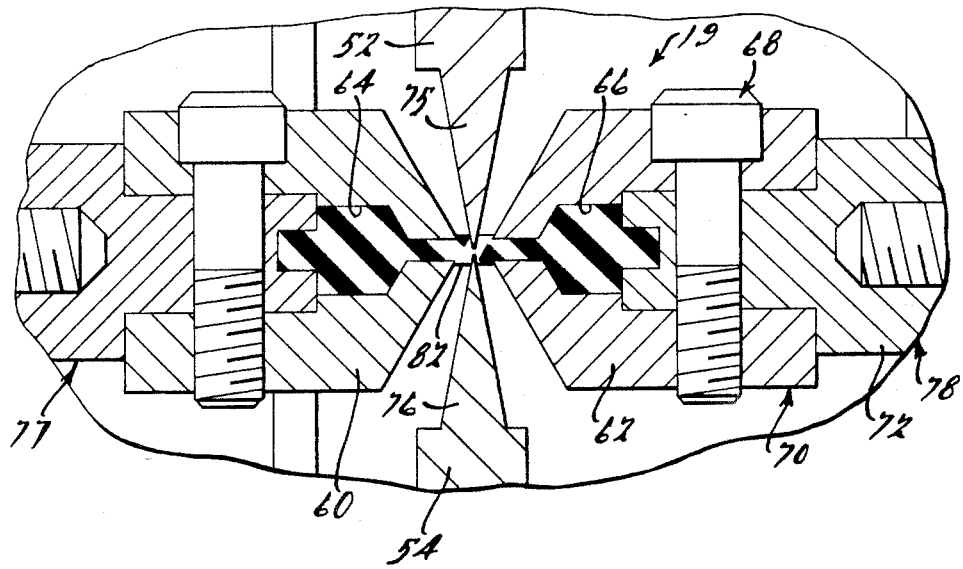
FIG. 3 is an enlarged cross-sectional view showing one cutting disc slitting configuration.
Figure 4:
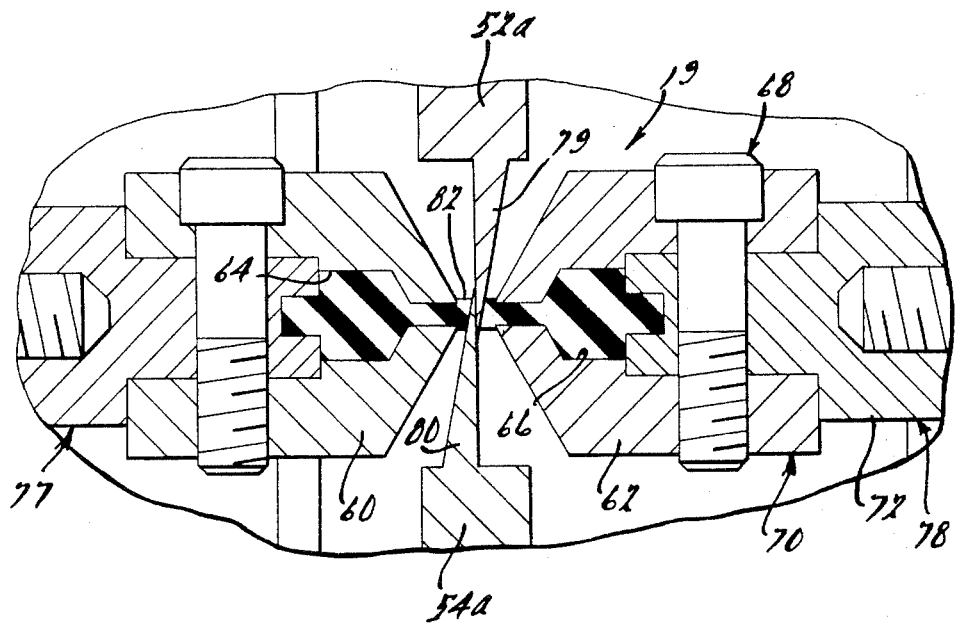
FIG. 4 is an enlarged cross-sectional view showing another cutting disc slitting configuration.

Turning now to FIGS. 3 and 4, there are illustrated two alternative arrangements of the cutting discs 52, 54 with respect to the stationary dies 64,66 holding the formed strip. In the embodiment shown in FIG. 3, which is also the embodiment illustrated in less detail in FIG. 2, knife edges 74, 76 are formed on the outer periphery of the cutting discs 52, 54, respectively, by beveling the outer periphery of the discs. The discs as shown are identical. The blades are positioned such that the outer extremity of the knife points 74, 76 are separated by only a few hundredths of a millimeter. It has been found experimentally that the gap between the disc tips should not exceed 0.003 inches and that the gap between the tips in the horizontal plane as shown in FIG. 3 must be 0.0025 inches or less. The discs 52,54 are positioned axially intermediate the two lateral ends 76, 78 of the die structure to symmetrically separate the strip. This placement defines an operative cutting area of the discs 52,54 in the gap between the dies 64,66.

In the embodiment shown in FIG. 4, the two blade edges are formed to have right triangular cross-section and are positioned to overlap each other with the flat sides of the blade edges kept in contact through imposition of spring pressure on the cutting discs 52A, 54A in a conventional manner. The amount of overlap between the blade edges 78,80 in the vertical plane as shown in FIG. 4 should be approximately 0.010 to 0.014 inches. This yields a scissors-like cutting action in separating the two halves of the strip. It should be appreciated that in either of the embodiments shown, the strip is cut from both sides at the same time to yield sharp regular corners on both sides of each wiper blade.

In operating the invention windshield wiper blade slitting device 10, a wiper blade molded or extruded strip comprising two identical halves of desired wiper blade cross-sectional configuration is introduced to the device 10 being supported by the guide roller assembly 18 and being pinchingly engaged by the drive roller 36. The drive roller 36 draws the strip through the device 10 past the rotating cutting discs 52, 54 to slit the strip into two wiper blade halves having sharp regular corners at the tip end 82. It has been found experimentally that operating the strip drive assembly to draw the strip through the device 10 at a rate of 250 feet per minute while operating the disc drive assembly 16 to effect a cutting disc surface velocity of 1,000 feet per minute successfully accomplishes the purpose of the invention.

While only two embodiments are specifically shown, others may be possible without departing from the scope of the appended claims.

We claim:

1. A slitting device for separating into two substantially identical halves an elastomeric strip formed to produce a pair of strips having a cross-sectional configuration which includes a tip portion of generally rectangular cross-section for defining an automotive windshield wiper blade, the slitting device comprising:

a base portion having upstanding support walls;

strip drive means having at least one drive roller journalled between spaced apart portions in the support walls, drivingly engageable with the strip and having a drive motor fixedly carried by the support walls and drivingly engaging the drive roller;

disc drive means including a drive motor fixedly carried by the support walls and a pair of cutting discs carried for rotation by a cutter housing mounted for adjustable positioning with respect to the rotary axes of the discs on portions of the support walls, the drive motor drivingly engaging the cutting discs and the rotary axes of the discs being located to define an operative cutting area of the discs and including means for permitting the outer peripheral cutting tips of the discs to be placed closely adjacent each other; and stationary guide means having a pair of die members each having a cavity formed therein for slidingly receiving outer surfaces of the strip and being carried in a portion of the support walls in juxtaposition to one another and being mounted to provide a space therebetween positioned in registration with the operative cuttting area of the discs whereby the extruded strip is forced through the dies by the drive roller and is sliced into two identical wiper blade strips by the cutting discs.

2. A slitting device as defined in claim 1 and further comprising a plurality of guide rollers journalled between spaced apart portions of the support walls and positioned to rollingly support the strip as it is forced throught the dies.

3. A slitting devide as defined in claim 2 wherein the disc drive means further includes power transmission means operatively connected between the drive motor and the discs and including means for maintaining a single constant speed for the discs.

4. A slitting device as defined in claim 2 wherein the disc drive means includes means for driving the discs to effect tangential movement thereby in the same direction.

5. A slitting device as defined in claim 2 wherein the peripheral cutting tips of the discs are positioned within 0.0025 inches of each other.

6. A slitting device as defined in claim 2 wherein the drive roller is formed as an elongated cylindrical member having reduced diameter central portions sized to pinchingly engage the strip.

7. A slitting device as defined in claim 1 wherein the disc drive means further includes power transmission means operatively connected between the drive motor and the discs and including means for maintaining a single constant speed for the discs.

8. A slitting device as defined in claim 7 wherein the power transmission means includes means for driving the discs to effect tangential movement thereby in the same direction.

9. A slitting device as defined in claim 7 wherein the peripheral cutting tips of the discs are positioned within 0.0025 inches of each other.

10. A slitting device as defined in claim 3 wherein the drive roller is formed as an elongated cylindrical member having reduced diameter central portions sized to pinchingly engage the strip.

11. A slitting device as defined in claim 1 wherein the disc drive means includes means for driving the discs to effect tangential movement thereby in the same direction.

12. A slitting device as defined in claim 1 wherein the peripheral cutting tips of the discs are positioned within 0.0025 inches of each other.

13. A slitting device as defined in claim 1 wherein the strip drive means includes means for drivingly engaging the strip to force the strip through the dies at a rate of 250 feet per minute.

14. A slitting device as defined in claim 1 wherein the drive roller is formed as an elongated cylindrical member having reduced diameter central portions sized to pinchingly engage the strip.

15. A slitting device for separating into two substantially identical halves an extruded elastomeric strip to produce a pair of strips having a cross-sectional configuration which includes a tip portion of generally rectangular cross-section for defining an automotive windshield wiper blade, the slitting device comprising:

a base portion having upstanding support walls;

strip drive means having at least one drive roller journalled between spaced apart portions in the support walls, drivingly engageable with the strip and having a drive motor fixedly supported by the supported walls and drivingly engaging the drive roller;

disc drive means including a drive motor fixedly supported by the support walls and a pair of cutting discs carried for rotation by a cutter housing mounted for vertically adjustable positioning on portions of the support walls, the drive motor drivingly engaging the cutting discs and the rotary axes of the discs being located to define an operative cutting area of the discs and including means for permitting the outer peripheral cutting tips of the discs to be placed in a relative position with respect to each other in which radially outer portions of the peripheral cutting tips overlap; and stationary guide means having a pair of die members each having a cavity formed therein for slidingly receiving outer surfaces of the strip and being carried in a portion of the support walls in juxtaposition to one another and being mounted to provide a space therebetween positioned in registration with the operative cutting area of the discs whereby the extruded strip is forced through the dies by the drive roller and is sliced into two identical wiper blade strips by the cutting discs.

16. A slitting device as defined in claim 15 wherein the peripheral cutting tips are of right triangular cross-section having surfaces normal to the rotative axes of the cutting discs positioned to overlap a predetermined amount.

17. A slitting device as defined in claim 16 wherein the predetermined amount is approximately 0.010 to 0.014 inches.

18. A slitting device as defined in claim 16 and further comprising means for resiliently urging the cutting discs together to effect scissors-like engagement of the overlapped portions.

19. A slitting device as defined in claim 15 and furher comprising means for resiliently urging the cutting discs together to effect scissors-like engagement of the overlapped portions.

* * * * *